US006978028B2

(12) United States Patent
Fink et al.

(10) Patent No.: US 6,978,028 B2
(45) Date of Patent: Dec. 20, 2005

(54) PROCESS AND DEVICE FOR FOCUSING ACOUSTIC WAVES

(75) Inventors: Mathias Fink, Meudon (FR); Jacques Lewiner, Saint-Cloud (FR)

(73) Assignee: Societe pour les Applications du Retournement Temporel, Suresnes (FR)

( * ) Notice: Subject to any disclaimer, the term of this patent is extended or adjusted under 35 U.S.C. 154(b) by 1215 days.

(21) Appl. No.: 09/737,194

(22) Filed: Dec. 13, 2000

(65) Prior Publication Data

US 2001/0001603 A1 May 24, 2001

Related U.S. Application Data

(60) Division of application No. 09/004,927, filed on Jan. 9, 1998, now Pat. No. 6,198,829, which is a continuation of application No. PCT/FR96/01083, filed on Jul. 11, 1996.

(30) Foreign Application Priority Data

Jul. 13, 1995 (FR) .................................. 95 08543

(51) Int. Cl.[7] ............................. H04B 3/00; H04B 1/02
(52) U.S. Cl. ......................................... 381/77; 367/138
(58) Field of Search ................................ 367/153, 154, 367/137, 138, 151; 381/77, 79, 92, 91, 122, 381/160

(56) References Cited

U.S. PATENT DOCUMENTS 4,112,411 A * 9/1978 Alais et al. ................. 367/135
4,882,714 A * 11/1989 Tanigawa ................... 367/103
5,092,336 A 3/1992 Fink
5,267,320 A 11/1993 Fukumizu
5,327,496 A 7/1994 Russell et al.
5,428,999 A 7/1995 Fink
5,431,053 A 7/1995 Fink
5,438,624 A 8/1995 Lewiner et al.
5,699,437 A 12/1997 Finn
5,745,580 A 4/1998 Southward et al.
5,834,647 A 11/1998 Gaudriot et al.
5,910,993 A 6/1999 Aoki et al.
5,963,651 A 10/1999 Van Veen et al.
5,978,489 A 11/1999 Wan
6,161,434 A * 12/2000 Fink et al. ..................... 73/587
6,198,829 B1 * 3/2001 Fink et al. ............... 381/71.12
6,449,566 B1 * 9/2002 Oeschger ..................... 702/54

(Continued)

FOREIGN PATENT DOCUMENTS

WO WO 94/24662 10/1994

OTHER PUBLICATIONS

Berkhout et al., "Acoustic Control by Wave Field Synthesis," *The Journal of the Acoustical Society of America* 5:2764-2778, May 1993.

(Continued)

*Primary Examiner*—Xu Mei
(74) *Attorney, Agent, or Firm*—Christensen O'Connor Johnson Kindness PLLC

(57) ABSTRACT

After emission of an acoustic pulse, having a first duration, from a given location, acoustic signals coming from the location are gathered through a multi-scattering medium on an array of transducers and recorded, for a second duration greater by at least one order of magnitude than the first duration. Return signals obtained by temporal inversion and amplification of the signals gathered during the second duration are emitted back from said transducers toward the multiscattering medium in order to focus acoustic energy to the location while providing temporal compression of the focussed acoustic energy.

16 Claims, 2 Drawing Sheets

U.S. PATENT DOCUMENTS

| | | | | |
|---|---|---|---|---|
| 6,490,469 | B2 * | 12/2002 | Candy | 600/407 |
| 6,671,227 | B2 * | 12/2003 | Gilbert et al. | 367/138 |
| 6,687,188 | B2 * | 2/2004 | Yang | 367/134 |
| 6,755,083 | B2 * | 6/2004 | Berryman | 73/602 |

OTHER PUBLICATIONS

Fink et al., "Phase Aberration Correction with Ultrasonic Time Reversal Mirrors," *Ultrasonics Symposium*, pp. 1629-1638, Jan. 1, 1994.

Prada et al., "The Iterative Time Reversal Mirror: A Solution to Self-Focusing in the Pulse Echo Mode," *The Journal of the Acoustical Society of America* 2(1):1119-1129, Aug. 1991.

Fink, "Time Reversal of Ultrasonic Fields Part I: Basic Principles," *IEEE Transactions on Ultrasonics Ferroelectrics and Frequency Control* 5:555-566, Sep. 1992.

Dowling, "Phase-Conjugate Array Focusing in a Moving Medium," *The Journal of the Acoustical Society of America* 3:1716-1718, Sep. 1993.

Dowling et al., "Narrow-Band Performance of Phase-Conjugate Arrays in Dynamic Random Media," *Acoustical Society of America, Applied Physics Laboratory, College of Ocean and Fishery Sciences, University of Washington, Seattle, WA 98105*, pp. 3257-3277, 1992.

* cited by examiner

PROCESS AND DEVICE FOR FOCUSING ACOUSTIC WAVES

This is a division of U.S. patent application Ser. No. 09/004,927 now U.S. Pat. No. 6,198,829 filed on Jan. 9, 1998 which is a continuation of International Application PCT/FR96/01083, with an international filing date of Jul. 11, 1996, and a priority date of Jul. 13, 1995, based on French Application 95/08.543. The International Application is expressly incorporated by reference herein.

FIELD OF THE INVENTION

The present invention relates to processes and devices for focusing acoustic waves. More particularly, the present is directed to a process and a device for focusing and temporal compression of acoustic energy. The term “acoustic” should be taken in a general sense, without limiting it to the audible frequencies. It may even be applied to radio waves, insofar as they have a mode of propagation which is akin to that of acoustic waves.

The invention is applicable in numerous fields of the art, among which may be mentioned the following.

The invention makes it possible to concentrate acoustic energy into a given location. This location may for example be that of a fixed target which it is sought to locate or destroy. The latter case is that of lithotrity or the destruction of a tumor in the body. It is also that of the destruction of an explosive contraption, such as a mine.

The location (or a set of such locations) can also be situated on a manufacturing line where objects each of which is to receive one or more intense, brief and localized pulses of acoustic energy are presented in succession.

It also allows communication between a station and a receiver placed at the location at which the energy is concentrated, with discretion ensured by the selective character of the energy concentration; several receivers may be provided, at the cost of an energy distribution.

BACKGROUND OF THE INVENTION

Processes are already known for examining a medium so as to pinpoint therein reflecting targets and/or for destroying the targets, using the temporal reversal of the signals received by the piezoelectric transducers of an array, before reemission (document EP-A-0 383 650).

Such processes perform a focusing of energy on a target, that is to say a spatial compression of energy.

The present invention is aimed in particular at carrying out, in addition to spatial compression by focusing, temporal compression of energy.

SUMMARY OF THE INVENTION

The invention proposes a process for focusing and temporal compression of acoustic energy into at least one location, comprising the steps of:

a) causing an emission from said location of an acoustic pulse, having a first duration, b) gathering acoustic signals coming from said location through a multi-scattering medium on an array of transducers and recording said acoustic signals, for a second duration greater by at least one order of magnitude than the first duration; and c) emitting return signals obtained by temporal inversion and amplification of the signals gathered during the second duration toward the multi-scattering medium, from said transducers.

In general, in the course of step a), a pulse will be sought of duration less than ten periods and preferably five, of the fundamental period in the case of resonant transducers.

The second duration is chosen so as to correspond to the spreading of the time of arrival of the acoustic energy having traversed the multi-scattering medium via all the possible paths within this medium, at least for as long as the transmitted energy remains appreciable.

By “multi-scattering medium” is understood a medium deliberately placed between the target location and the transducer array, and in which are dispersed or distributed elements which reflect or individually scatter the acoustic energy, with weak absorption, of a nature such as to cause a spreading of at least one order of magnitude of the duration of the initial pulse. In the case of a quasi-random distribution of elements within the volume of the propagation medium, the nature of such a multi-scattering medium can be defined by the mean free path I of the acoustic waves within this medium, that is to say by the distance over which an incoming initial plane wave completely loses the memory of its initial direction. This mean free path I is equal to $1/n\sigma$ where n is the volume density of the scattering elements and where $\sigma$ is their scattering cross section. The free path is all the smaller the larger is $\sigma$, this being obtained when the frequency of the acoustic waves is close to the resonance frequencies of the elements. These elements may be of very diverse natures. They may in particular be rods, flakes, beads, bubbles of gas, reflecting particles. Typically, the mean dimension a of the particles is such that $2\pi a/\lambda$ is of the order of unity, $\lambda$ being the wavelength of the acoustic waves emitted, or the wavelength corresponding to the center frequency of the spectrum emitted.

When seeking a large spreading of the duration of a pulse and a high compression factor, the thickness e of such a medium (length occupied between the target location and the array) must be greater than the mean free path; a thickness of at least five times is often desirable.

The reflecting elements of the multi-scattering medium may also be distributed at the periphery of the propagation medium. They may in particular consist of discontinuities of impedance between the propagation medium and the outside medium. The multi-scattering medium then includes an acoustic channel between the location of concentration of the waves and the transducers, the walls of which produce, through multiple reflections, the temporal spreading of the initial pulse and the bunching of the return waves.

In the course of step b), recording is performed during a time window which, especially when an acoustic signal is liable to come from several distinct locations, is chosen as a function of the selected location and of the nature of the medium.

It may also be remarked that by giving the multi-scattering medium an angular aperture, viewed from the location of concentration, markedly greater than the angular aperture of the array, a much finer resolution of the refocusing spot than in the case of a homogeneous medium is also obtained. The scattering medium acts, after temporal reversal, like an emitter whose angular aperture, viewed from the location, may be much greater than the angular aperture from which the array is viewed.

The principle implemented by the invention stems from the foregoing. The acoustic return signals (step c) above) travel through the scattering medium along paths which are the reverse of those traveled earlier, insofar as the medium does not alter or alters only very slowly (typically with displacements of the scatterers not producing a modification of the length of the multiple scattering paths of more than 1/10 of the smallest wavelength for which the spectrum emitted exhibits appreciable power) on account of the principle of reversal. The re-emitted acoustic wave undergoes all the scatterings and/or multiple reflections in a time sequence which is the reverse of that of the outward journey and re-forms at the output of the medium the initial acoustic wave, consisting of a short pulse.

When the multi-scattering medium is, totally or partially, surrounded by reflecting surfaces in respect of the waves, all of the re-emitted energy is concentrated onto the chosen location for the duration of the initial pulse, and a much larger gain is obtained than the conventional antenna gain due to focusing, since it is multiplied by a temporal compression factor. Even with transducers of low power or amplifiers with low gain, it is possible to concentrate high powers when the multiscattering medium causes a substantial lengthening, which may be of the order of 100 and more.

Another aspect of the invention relates to a device for focusing and temporal compression of acoustic energy into one location, comprising:

- means for causing emission of a brief acoustic pulse from said location;
- an array of transducers;
- a multi-scattering medium to be interposed between the transducer array and said location, and arranged to provide a time spreading of the acoustic pulse so as to increase the duration of said pulse by at least one order of magnitude at the level of the transducer array, the transducer array being controlled to emit acoustic signals obtained by temporal inversion and amplification of acoustic signals picked up in response to the emission of said pulse.

DESCRIPTION OF PREFERRED EMBODIMENTS

Figure 1:
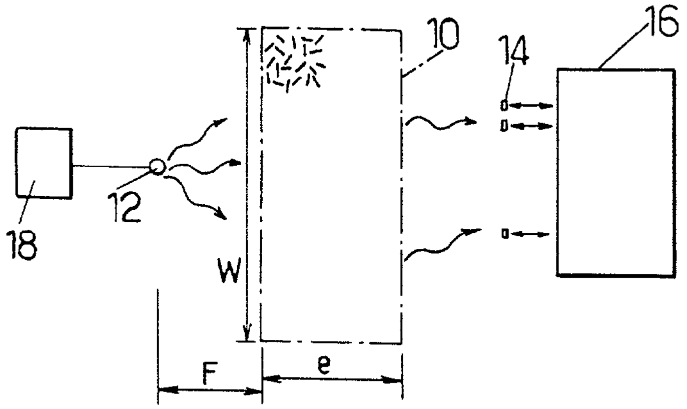
FIG. 1 is a basic diagram showing the conditions of a trial intended to prove the feasibility of the process.

In order to bring out the benefit of the invention, the results will firstly be given of trials performed using, as multi-scattering medium, parallel metal rods distributed quasi-randomly and having a diameter of the order of the wavelength X of the acoustic energy. FIG. 1 shows the multi-scattering medium 10 interposed between a source 12, which constitutes a target situated at a location at which the concentration will be performed, and an array of emitter/receiver transducers 14 linked to a circuit 16 having as many emission/reception pathways as there are transducers. This circuit 16 has a construction of the kind already described in the documents EP-A-0 383 650 and EP-A-0 591 061.

The trials were performed with a target 12 consisting of a hydrophone furnished with an excitation circuit 18 and capable of emitting brief pulses, of 1 microsecond, with a center frequency of 3 MHz. The multi-scattering medium 10 consists of rods 0.5 mm long, with a mean spacing of the order of 2 mm. The thickness e of the medium was 45 mm. The mean free path, for the wavelength considered, was around I=7 mm. The width w was of the order of 120 mm.

The spherical acoustic wave emitted by the target 12, the emitting part of which had a diameter of the order of 0.5 mm, undergoes multiple scatterings, without noticeable dissipation owing to the reflectivity of the metal. The transducer array 14 contained 48 transducers and the associated circuit 16 was designed to record the individual signals over durations of around 100 microseconds, corresponding to the spread in the arrival times of the acoustic waves having traversed the multi-scattering medium via all the possible routes.

The circuit 16 included, for each pathway, an analog/digital converter, a memory organized as a queue and means of reading together with reverse time sequencing and amplification.

Measurement of the characteristics of the return wave having traversed the medium 10 has shown that the beam is refocused onto a zone having a width, at −6 dB, substantially equal to $\lambda F/W$, F being the distance between the exit plane of the multi-scattering medium and the target. This focal spot is finer than it would have been in the absence of the multi-scattering medium. The latter in fact exhibits a much wider angular aperture, viewed from the target, than the transducer array 14.

Figure 2:
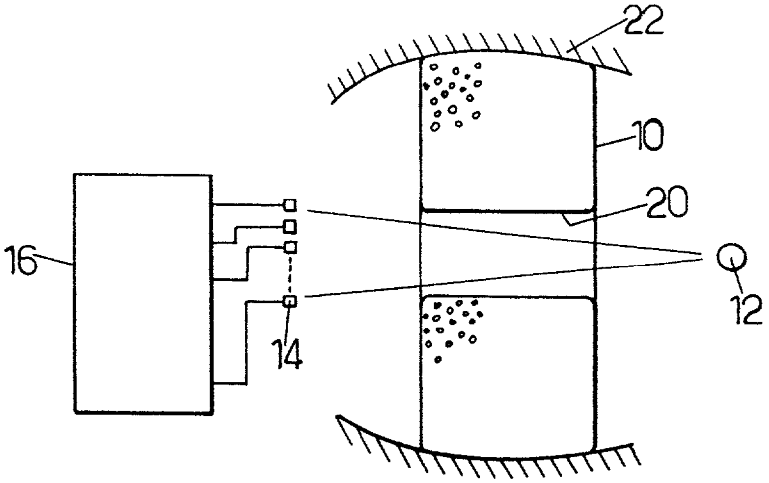
FIG. 2 is a diagram of a first embodiment.

The device diagrammatically illustrated in FIG. 2 (in which the items corresponding to those already shown in FIG. 1 are designated by the same reference numerals) is intended to concentrate, onto a passive target 12, a brief and intense pulse, with low-power emission means.

Figure 3A:
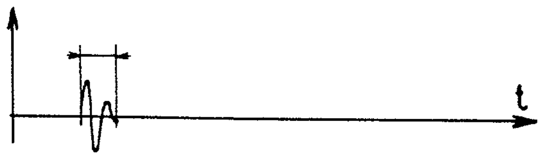
FIGS. 3A to 3C show the shape of the acoustic signals.
Figure 3B:
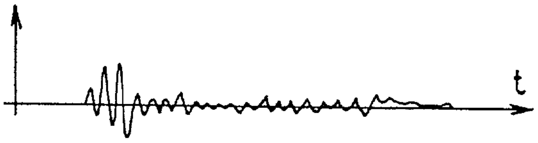

In this case again, a multi-scattering medium 10 is interposed between the array of piezoelectric transducers 14 and the target 12. The transducers 14, or at least some of them, are designed to send to the target 12, which is reflecting, a brief pulse at the frequency of the acoustic waves to be concentrated. It is also possible to use different transducers for the first illumination (step a) above) and for reception and reemission (steps b) and c)). An aperture 20 of sufficient dimension to allow the passage of a brief shot of illumination, without scattering, is made in the multiscattering medium 10. The illuminated target sends back, to the multi-scattering medium 10 and the transducer array 14, the wave which is next temporally reversed. The wave received and reflected by the target 12 can have the temporal variation shown diagrammatically in FIG. 3A. This type of signal, having a few fundamental periods and being wideband, can in particular be obtained with the aid of composite technology transducers. The echo signal received by a particular transducer will then have, owing to the fact that part at least of the reflected energy has undergone multi-scattering, a shape which is for example that shown in FIG. 3B.

To reduce the losses of acoustic energy, means such as mirrors 22 can be arranged around the multi-scattering medium 10, in such a way as to reduce the reemissions of acoustic energy toward directions other than that of the target and/or to construct an acoustic channel.

Figure 3C:
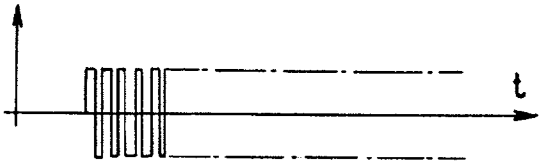

In a simplified variant embodiment, the signal returned by each transducer 14 is not obtained by analog amplification of the reversed signal, but by returning a signal consisting of alternately positive and negative pulses, each having the same duration and the same sign as the corresponding alternation (FIG. 3C).

Figure 4:
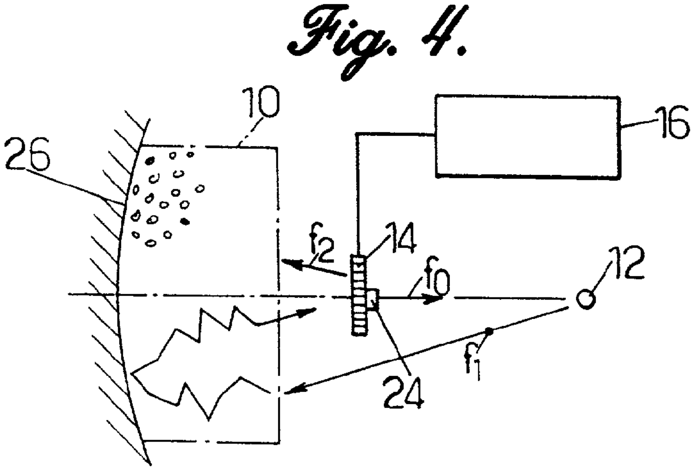
FIGS. 4 to 6 show three alternative embodiments.

In the variant embodiment shown in FIG. 1, the multi-scattering medium 10 is placed opposite the target 12 with respect to the transducer array 14. In this case, the first illumination is performed by an additional emitter 24 (in the direction $f_0$ of FIG. 4). The acoustic energy reflected by the target 12 crosses the medium 10 twice, with an intermediate reflection on a mirror 26, as indicated by the arrow $f_1$. The array 14 also re-emits toward the mirror 26 (arrow $f_2$).

In yet another case, it is sought to concentrate energy in a specified zone in space, constituting a target, which has been selected beforehand. In this case, step a) can be performed only in the course of a gauging phase. Subsequently, the concentration of energy is performed by repeating step c).

This latter mode of execution makes it possible in particular to transmit messages which will be receivable with high power and intelligibly only in a well specified zone. The multi-scattering medium must then be completely stationary.

In this case, if the acoustic wave received in the course of step b) by a transducer i is representable by $e_i(t)$ and the message to be transmitted is of the form s(t), the amplifier provided on the pathway associated with transducer i will be designed so that the emission by the transducer is of the form $e_i(\tau-t)s(t)$, T being a fixed delay identical for all the transducers. Demodulation will be performed in conventional manner, irrespective of the modulation of the signal s(t).

For underwater transmission, for example from a vessel or an underwater robot, the transducer array can be aimed away from the target and oriented toward a wall of the underwater acoustic channel, such as the surface or the bottom.

Figure 5:
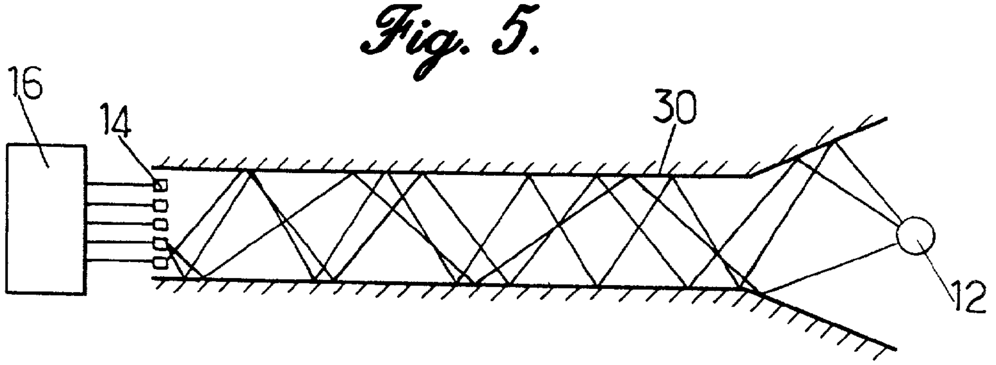
Figure 6:
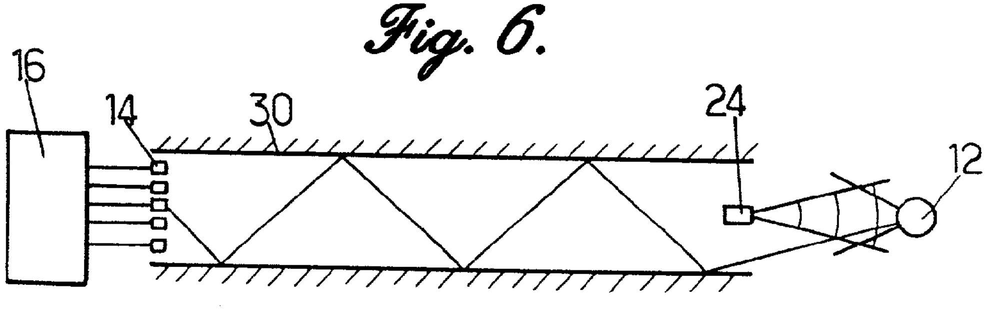

In the variant embodiments of FIGS. 5 and 6, the multi-scattering medium 30 contains no elements distributed randomly within the volume of the propagation medium, but only reflecting elements distributed at its surface, thus defining a channel or acoustic waveguide. The transducer array 14 is placed at one end of this waveguide.

In the case of FIG. 5, the gauging source 12 is placed at the other end of the waveguide 30. The numerous reflections on the reflecting wall spread the duration of the initial pulse at the level of the array 14, and conversely compress this duration during re-emission focused toward the location initially occupied by the gauging source.

In the case of FIG. 6, a transducer 24 is placed near the end of the waveguide 30 so as to illuminate the reflecting target 12 in the direction away from the guide 30 during the initial step. The transducer 24 can be fixed by means of a mounting which does not hinder the propagation of the waves, such as three wires oriented radially with respect to the axis of the guide, at 120° to one another. That part of the brief illumination beam which is returned by the target 12 to the guide 30 then undergoes the multiple reflections which spread its duration. After temporal reversal and amplification, the energy will be concentrated onto the reflecting target 12 if it has not shifted too far.

Transducers and an associated circuit enabling the processes mentioned above to be implemented will not be described here in a complete manner. Indeed, the construction of the circuits can be similar to that already given in the previously mentioned earlier patent applications. It is only necessary that the memories organized into a queue which are intended to record the complex signal received by the transducers 14 have sufficient capacity. The capacity of these memories will have to be further increased if it is desired to store the wave forms recorded beforehand in relation to several distinct locations, subsequently selectable at will in the re-emission phases. The gain of the amplifiers provided on each pathway of transducers will, for a given power to be concentrated, depend on the temporal spreading produced by the multi-scattering medium 10.

While the preferred embodiment of the invention has been illustrated and described, it will be appreciated that various changes can be made therein without departing from the spirit and scope of the invention.

What is claimed is:

1. A process for focusing and temporal compression of acoustic energy into at least one location, which comprises:

a) causing an emission from said location of an acoustic pulse, having a first duration, b) gathering acoustic signals coming from said location through a multi-scattering medium on an array of transducers and recording said acoustic signals, for a second duration greater by at least one order of magnitude than the first duration; and c) emitting return signals obtained by temporal inversion and amplification of the signals gathered during the second duration toward the multi-scattering medium, from said transducers.

2. A process according to claim 1, wherein the multi-scattering medium has a greater angular aperture than said array, viewed from said location.

3. A process according to claim 1, wherein the temporally inverted signals are amplified with a gain which is an increasing function of the time of arrival at the transducers.

4. A process according to claim 1, wherein the return signals in step c) are of constant amplitude and have the sign of the recorded signals.

5. A process according to claim 1, wherein the return signals are modulated by a message to be transmitted.

6. A process according to claim 1, wherein steps (a) and (b) are performed once in the course of a calibrating phase and the return signals are emitted repetitively, the multi-scattering medium being stationary.

7. A process according to claim 1, wherein the multi-scattering medium has an aperture, and wherein step (a) comprises emitting from the transducer array an illumination beam through the aperture of the multi-scattering medium, and reflecting the illumination beam by a reflecting target defining said location.

8. A process according to claim 1, wherein step (a) comprises emitting from a transducer not belonging to the array an illumination beam, and reflecting the illumination beam by a reflecting target defining said location.

9. A process according to claim 1, wherein said multi-scattering medium comprises a propagation medium and distributed reflecting elements.

10. A process according to claim 9, wherein the reflecting elements are distributed within the volume of the propagation medium.

11. A process according to claim 9, wherein the reflecting elements are distributed at a periphery of the propagation medium.

12. A process according to claim 11, wherein the reflecting elements consist of discontinuities of acoustic impedance between the propagation medium and an outside medium.

13. A device for focusing and temporal compression of acoustic energy into at least one location, comprising:

means for causing emission of a brief acoustic pulse from said location;

an array of transducers;

a multi-scattering medium to be interposed between the transducer array and said location, and arranged to provide a time spreading of the acoustic pulse so as to increase the duration of said pulse by at least one order of magnitude at the level of the transducer array, the transducer array being controlled to emit acoustic signals obtained by temporal inversion and amplification of acoustic signals picked up in response to the emission of said pulse.

14. A device according to claim 13, wherein the multi-scattering medium has a thickness substantially greater than a mean free path of acoustic waves in said medium.

15. A device according to claim 13, comprising means defining an acoustic channel.

16. A device according to claim 15, wherein the transducer array is oriented toward a wall of the acoustic channel.

* * * * *